United States Patent [19]
Graber

[11] 3,759,056
[45] Sept. 18, 1973

[54] SHUTTER CONTROL SYSTEM
[75] Inventor: Walter P. Graber, Cadillac, Mich.
[73] Assignee: Kysor Industrial Corporation, Cadillac, Mich.
[22] Filed: July 3, 1972
[21] Appl. No.: 268,575

[52] U.S. Cl............ 62/183, 165/23, 49/21, 49/31, 236/35.3, 62/181, 62/182, 62/184, 98/121
[51] Int. Cl............ F25b 39/04
[58] Field of Search......... 165/23, 43, 101; 62/181, 182, 183, 184; 49/21, 31, 77, 80; 236/35.2, 35.3; 98/121

[56] References Cited
UNITED STATES PATENTS
| | | | |
|---|---|---|---|
| 2,318,893 | 5/1943 | Smith | 62/183 |
| 2,455,421 | 12/1948 | Kirkpatrick | 62/181 |
| 2,958,208 | 11/1960 | Braden | 62/181 |
| 3,004,402 | 10/1961 | Dart | 62/183 |
| 3,148,514 | 9/1964 | Mathis | 62/183 |
| 3,543,838 | 12/1970 | White | 165/23 |

Primary Examiner—William J. Wye
Attorney—Peter P. Price et al.

[57] ABSTRACT

A unified shutter assembly for controlling air flow over radiator and air conditioner condenser elements in a vehicle is normally biased to an open position and is closable in response to engine heating requirements by a first actuator to regulate the amount of flow of cooling air. A second actuator positioned for movement in opposition to the first is operated simultaneously with the air conditioning system to force the shutters open a controlled, limited amount to allow controlled air flow over the condenser sufficient for condenser cooling without being detrimental to engine temperature control, i.e., without significantly lowering the engine temperature.

13 Claims, 4 Drawing Figures

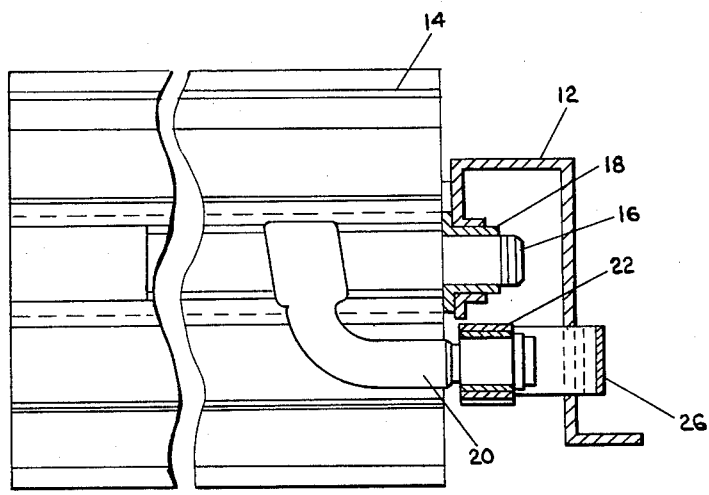
FIG. 2
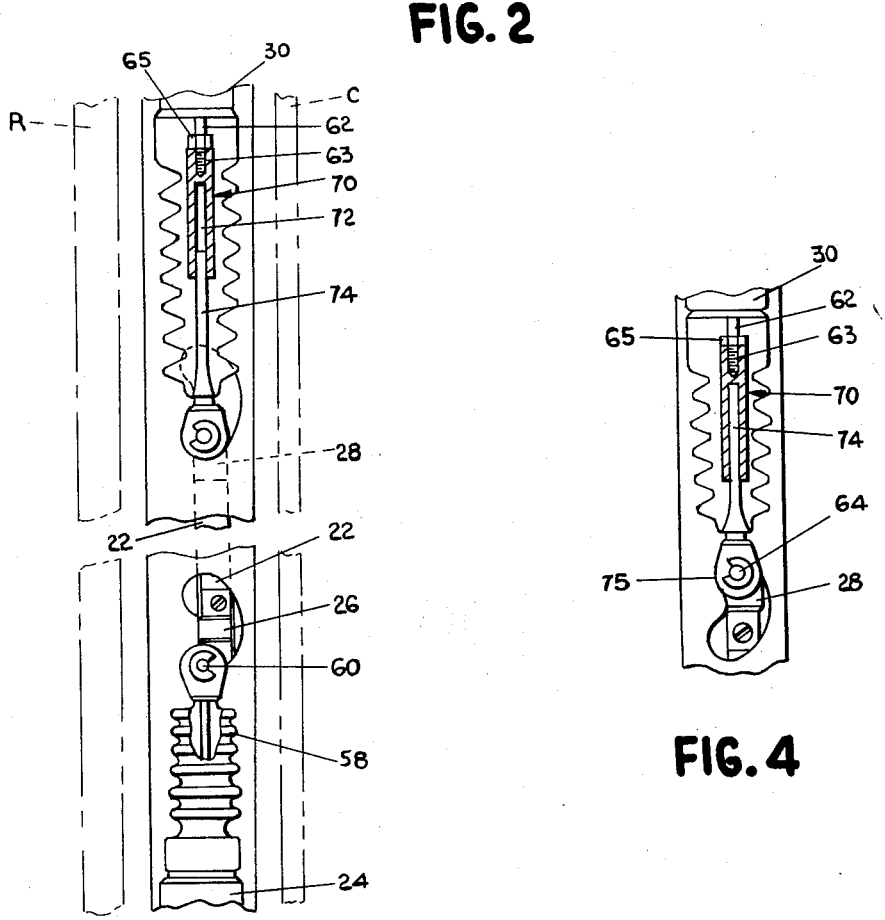
FIG. 3
FIG. 4

SHUTTER CONTROL SYSTEM

BACKGROUND OF THE INVENTION

This invention relates to vehicle cooling and heating systems wherein the flow of cooling air over the vehicle radiator and over the air conditioning condenser is controlled by a shutter or louver assembly mounted on the front of the vehicle. Conventionally, opening and closing of the louvers is controlled in response to temperature and/or pressure requirements of the vehicle's engine and air conditioning system. Sensing devices responsive to temperature and pressure are provided to control operating elements such as actuators which are operatively connected to open or close the louvers to thereby allow more or less air to flow through the radiator and the condenser. Such temperature control systems and sensors are well-known to those skilled in the art and are illustrated by way of example in U. S. Pat. Nos. 2,248,094; 2,805,027; 3,006,552; and others assigned to the assignee of the present invention.

The louver or shutter assembly used to control the air flow over the engine radiator may be oriented horizontally or vertically over the face of the radiator and basically comprises a plurality of cooperative slats or louvers pivotally mounted at their ends. Crank arms on the louvers are operatively engaged by a control bar which moves the louvers into either an open or closed position. The control bar is operated by an actuator element which, in response to engine temperature control requirements, shifts the bar to operate the louvers. A typical shutter assembly is described in U. S. Pat. No. 3,198,298, entitled SHUTTER SLAT AND SLAT MOUNTING also assigned to the assignee of the present invention by D. R. Ferris, dated Aug. 3, 1965.

In vehicles having air conditioning systems, the condenser element for the air conditioner also requires the flow of cooling air over it. One system for separably controlling the air flow over these elements is illustrated in U. S. Pat. No. 3,543,838, wherein the air conditioner condenser is mounted adjacent the radiator. The apparatus disclosed therein provides a pair of louver assemblies and a pair of operable air flow control elements to vary the flow of air through the shutter assemblies. A first control element is connected to respond to variations in the temperature of a liquid in the radiator while a second control element is connected to respond to changes in pressure in the air conditioning condenser. In that particular unit, the shutter assembly is divided into two sections, one section covering the condenser and the other section covering the radiator. The two sections are operated independently in response to condenser cooling requirements and are operably coupled together in response to engine temperature control requirements.

SUMMARY OF THE INVENTION

The present invention relates to a shutter apparatus and a control system, particularly for controlling the flow of cooling air over a vehicle radiator and air conditioner condenser mounted in front or behind it.

The vehicle radiator, typically mounted at the front of the vehicle, has the air conditioner condenser mounted in the air flow path either in front of or behind the radiator. Preferably, the condenser is mounted in front of the radiator. In some cases the condenser may form the vehicle grill with the shutters mounted behind the grill. In this manner, the condenser is always subjected to ram air and in response to opening of the shutters, is subjected to additional air flow through the shutters and radiator core. Alternately, it will be realized that the condenser may be positioned between the shutters and radiator or behind the radiator depending upon the particular design requirements of the vehicle.

The shutter assembly basically is a unitary assembly that includes a plurality of louvers which are interconnected through an operating mechanism for conjoint movement. They are normally biased into an open position. A first actuator connected to the operating mechanism and responsive to engine temperature closes the shutters when engine heating is required. A second actuator element also connected to the operating mechanism is responsive to operation of the air conditioning compressor. When the compressor is operated with the shutters closed, electrically operated valve means associated with the second actuator operates the second actuator to force the shutters open a limited controlled amount in opposition to the force of the first actuator to provide flow of cooling air over the condenser. The second actuator, arranged to operate in opposition to the first actuator, has sufficient force to overcome the first actuator a predetermined amount to open the shutters a slight regulated amount that is small enough to prevent significant effect on the engine temperature and its control. Thus, the engine is not improperly cooled down.

It is a primary object of the present invention to provide an air control system for a vehicle employing a unitary shutter assembly which operates to satisfy the cooling requirements for both the engine radiator and the air conditioner condenser.

It is another object of this invention to provide air flow over an air conditioner condenser core by allowing the shutter assembly associated therewith to open a regulated amount sufficient to provide condenser cooling without adversely affecting overall engine temperature control.

It is a further object of this invention to provide a shutter control system including a pair of actuator elements, one of which is responsive to engine temperature and the second of which is responsive to operation of the air conditioner compressor, with the second actuator element operable in opposition to the first to force the shutters open a limited amount.

These and other important objects and advantages of the present invention will become readily apparent to those skilled in the art upon reading the following description and with reference to the accompanying drawings illustrating a preferred embodiment of the invention.

BRIEF DESCRIPTION OF THE DRAWINGS

FIG. 2 is a cross-sectional view taken along the plane II—II of FIG. 1 illustrating a shutter mounting arrangement including the control mechanisms therefor;

FIG. 3 is a partial side elevational view of FIG. 1 with portions in cross section for clarity; and FIG. 4 is a partial cross-sectional view of the second actuator member shown in FIGS. 1 and 3 with the shutters in a closed position.

DESCRIPTION OF THE PREFERRED EMBODIMENT

Figure 1:
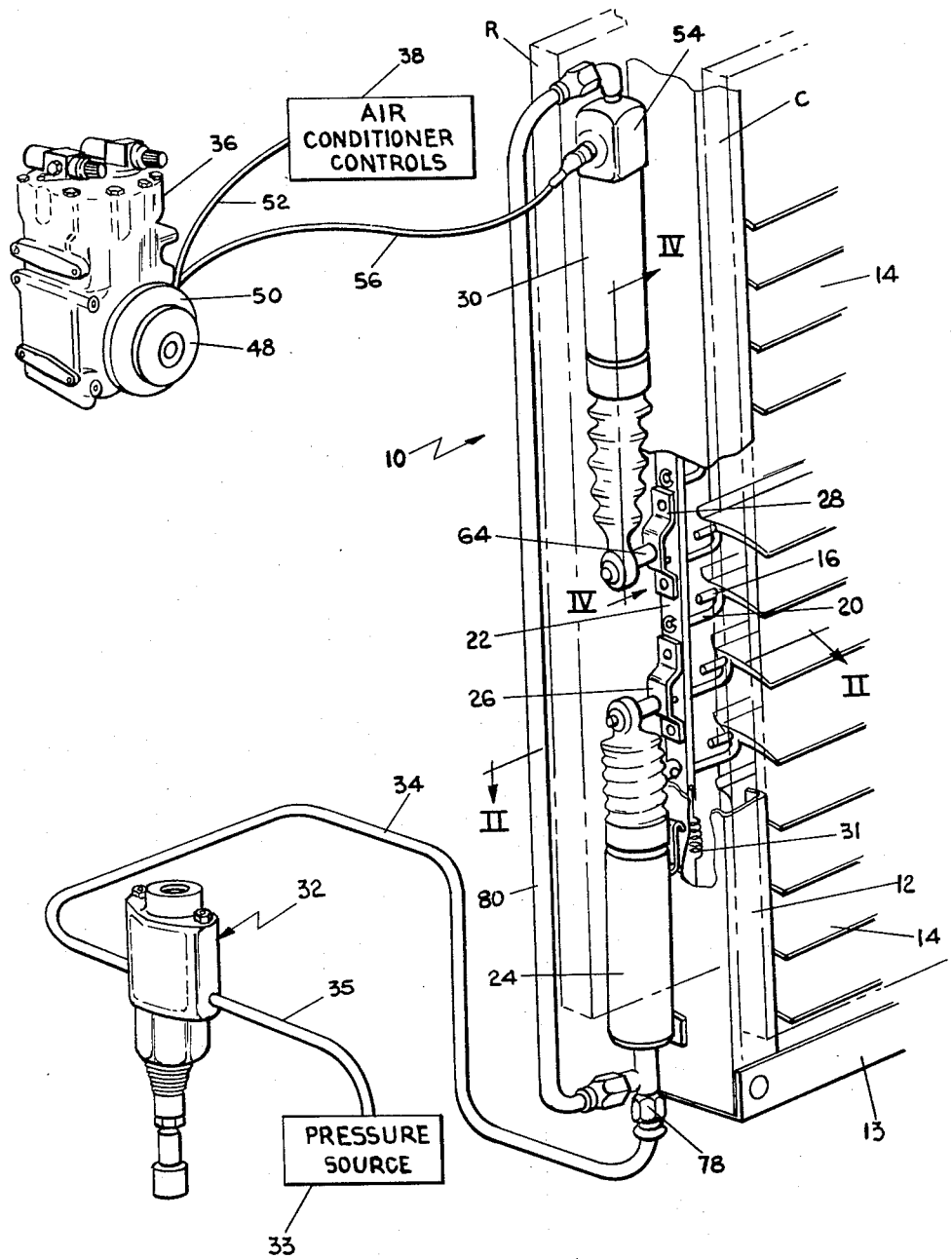
FIG. 1 is a perspective and partially schematic view of the shutter control system of the present invention.

Referring now to the drawings, the control assembly includes a shutter assembly 10 of detailed construction such as in the above-mentioned U. S. Pat. No. 3,198,298. Shutter assembly 10 includes a rectangular framework having opposed side walls 12 and end walls 13 which are attachable to enclose the grill or other opening at the front of an automotive vehicle. A plurality of louvers or shutters 14 are pivotally mounted in the framework by pintles 16 extending from opposite ends of the louvers. Pintles 16 are received in bearings 18 fixed in side walls 12. Pintles 16 on one side of each louver 14 are associated with eccentric crank arms 20 connected to a control bar 22. Control bar 22 is operatively connected to a first fluid pressure actuator cylinder 24 (FIG. 1) through a drive block 26 which is fixed to control bar 22. A second drive block 28 (FIG. 1) also connected to control bar 22 is connected to a second fluid pressure actuator cylinder 30. The first or primary actuator cylinder 24 is operated by suitable control valve means 32 for controlling fluid pressure to the actuator. Extension of its piston rod lifts control bar 22 and crank arms 20 to controllably close the louvers and regulate the amount of air flow therethrough. Normally, the louvers and control bar are biased into an open position by means of suitable biasing means such as spring 31 connected to control bar 22 and to the supporting framework.

The control valve means 32 is a thermally responsive valve which is mounted on the block or head of an internal combustion engine to sense the temperature in the cooling jacket of the engine. An external source of pressure 33 is connected through control valve means 32 to actuator element 24 by means of conduits 34 and 35. Valve means 32 controls the admission of fluid pressure from a source 33 such as a pump or the like operated by the engine. This operates primary actuator cylinder 24 for shifting the louvers to a closed position. A suitable thermostatic control valve which may be utilized in the practice of this invention is illustrated in commonly assigned U. S. Pat. No. 3,135,495 entitled THERMOSTATIC CONTROL VALVE issued to D. R. Ferris on June 2, 1964.

The improvement of the present invention resides particularly in the provision of a shutter control system that has incorporated in the combination of a unique secondary actuator 30 which is operative to open the shutter assembly a limited controlled amount to effect condenser cooling when required, while limiting cooling air flow so as not to be detrimental to engine temperature control. Generally, this apparatus finds application where the condenser core covers two-thirds or more of the radiator face area of the vehicle.

Secondary actuator 30 is operated with operation of the vehicle air conditioner compressor 36. Compressor 36 forms a part of the air conditioning system in a conventional manner through suitable control circuits 38 in the vehicle.

It will be understood that the condenser core for the air conditioning system may be positioned in front of the shutter assembly, behind the shutter assembly, between the shutter and radiator, or behind the radiator assembly. In one embodiment, the condenser actually forms the grill of the vehicle. In the embodiment illustrated in FIGS. 1 and 3, the condenser C is shown in phantom in front of the shutter assembly and the radiator R is shown in phantom behind the shutter assembly. When the shutters are completely closed, the condenser is subjected to ram air only. When the shutters are opened, even a limited amount, the air is allowed to flow through the condenser-grill and shutters and effectively cool the condenser coil as will be hereinafter described.

Compressor 36 is driven by any suitable drive means such as the vehicle engine by a "V" belt or the like (not shown) connected to pulley wheel 48 which in turn is connected through a clutch mechanism 50. The clutch 50 is preferably an electromagnetic clutch which is actuated and deactivated through suitable wiring 52 connected to the control circuits 38 to shift the drive means into engagement with the compressor.

A normally closed solenoid valve 54 connected to the pressure inlet of actuator 30 is electrically operated by a signal through electrical wire 56 connected to the electrical system for operating the clutch 40. Operation of the clutch in response to air conditioning demands therefore causes corresponding operation of the solenoid valve 54, shifting it into open position.

Actuator members 24 and 30 may be identical air cylinders, each having a piston therein movable in response to pressurized fluid. Air cylinders suitable for use in this invention are commercially available from Kysor of Cadillac, Division of Kysor Industrial Corporation, Cadillac, Michigan, under their part No. 1017–21550–01. The normally closed solenoid valve is also available from Kysor of Cadillac, part No. 1017–32130. It is recognized, of course, that suitable hydraulic or electro-mechanical actuator mechanisms and valves could be used with equal facility.

Referring additionally to FIG. 3, air cylinder 24 includes an extendable piston rod 58 which is connected to a stud 60 extending from mounting block 26. Normally, the louvers 14 are biased to an open position by biasing spring 31 (FIG. 1) and piston rod 58 is retracted. Under normal conditions, when the air conditioning system is not operating and there is no demand for cooling air over the air conditioner condenser, the shutters are biased to a normally open position. when the engine is operated, fluid pressure from source 33 and line 35 passes through control valve 32 and line 34 to actuator 24 causing piston rod 58 to extend. This shifts control bar 22 upwardly and causes louvers 14 to close. When engine operating temperatures are reached and sensed by valve 32, valve 32 closes and the supply of air through line 34 to the actuator 24 is eliminated, allowing shutters 14 to controllably open. In this manner, the flow of cooling air through the shutters and over the radiator is carefully controlled to maintain optimum engine temperature as sensed by valve 32.

Referring additionally to FIG. 4, the piston rod 62 of cylinder 30 is modified somewhat to include an adjustable "floating" or lost motion connection with control bar 22. Piston rod 62 is extendable and retractable in cylinder 30 and is threaded at 63 on its extended end to receive an elongated sleeve or connector 70. The sleeve includes an axial opening 72 in which one end of a linking member 74 is slidably received. The opposite end of linking member 74 is adapted for pivotal connection to a stud 64 extending from drive block 28 fixed on control bar 22.

Referring again to FIG. 1, cylinder 30 is actuated in the same manner as cylinder 24 by pressurized fluid through control valve 32. A "T" 78 is provided at the connection of line 34 to cylinder 24 and a second conduit 80 connected to the "T" extends through solenoid valve 54 which controls the fluid pressure to cylinder 30. Normally, when the air conditioning compressor 36 is not operating, solenoid valve 54 is closed, thereby blocking the flow of the fluid pressure through line 80 to cylinder 30. It will be noted that cylinders 24 and 30 are mounted on side wall 12 in opposition to each other, i.e., piston rod 58 of cylinder 24 is oriented upwardly while piston rod 62 of cylinder 30 is oriented downwardly. Referring again to FIG. 3, when the shutter assembly is in its normally biased open position, piston rods 58 and 62 are retracted. Control bar 22 moves downwardly under the influence of biasing means 31. Link 74 connected to upper drive block 28 is free to move with respect to the piston rod 62 in cylinder 30 because of the sliding fit in opening 70 in connector 70.

When the shutters are in their normally open position, as the vehicle engine is started with the air conditioner control turned off, clutch 50 is not energized and the compressor is not operating. The shutters then operate in a conventional manner. That is, if the engine requires heating, fluid pressure passing through valve 32 is applied through line 34 to actuator 24, causing the piston rod 58 to extend and shift the control bar upwardly to close louvers 14. As is also conventional, when engine operating temperatures are reached, valve 32 closes, cutting the air supply to actuator 24, allowing the shutters to be biased open by the spring. In this manner, the flow of cooling air through the shutters is controlled in response to engine temperature. Operation of actuator 24 and the corresponding movement of control bar 22 to close the shutter freely shifts link 74 along the opening 72 in sleeve 70 without affecting actuator 30. When the shutters are completely closed, link 74 is slidably shifted along the opening 72 in sleeve 70.

As long as there is no demand for condenser cooling air, the system will continue to operate as hereinabove described. If the shutters are closed, however, and the air conditioning system is turned on, solenoid valve 54 is energized simultaneously with the clutch 50 by means of an electrical input through lines 52 and 56. This opens solenoid valve 54 to allow fluid pressure in lines 34 and 80 to pass through valve 54 and into actuator 30. Piston 62 extends, sliding sleeve 70 along link 74 until the link bottoms in opening 72. At that time, a force applied on link 72 shifts control bar 22 to tend to open the shutters a limited amount. Actually, the force applied by cylinder 30 and piston rod 62 is in opposition to the force applied by cylinder 30 and piston rod 58. In the preferred embodiment, cylinders 30 and 24 are of equal force, with spring 31 assisting cylinder 30 to overcome cylinder 24. Cylinder 30 and spring 31 therefore comprise counterforce applicator means in opposition to direct force applicator means 24. These force the louvers to open a slight but definite, controlled amount. The amount of controlled opening is governed by the amount of play or lost motion between link 74 and sleeve 70. This can be adjusted by the connection of threads 63 in the end of sleeve 70, using lock nut 65 to retain the adjustment.

The amount that the shutters open may be controlled by varying the amount of free travel of link 74 in opening 72. In a preferred embodiment, the shutters open approximately one-eighth of an inch. Referring to FIGS. 3 and 4, when actuator 24 is energized, piston rod 58 moves a distance of approximately one and one-eighth of an inch shifting the actuator bar 22 to close the louvers. This movement in turn causes link 74 to move partially into sleeve 70. Preferably seven-eighths of one inch of free travel remains between the end of the link and the bottom of opening 72. When solenoid valve 54 is energized by operation of the compressor clutch 50, fluid pressure in line 80 (which is connected to line 34 through the "T" 78) applies the fluid pressure to cylinder 30. Piston rod 62 is extendable approximately one inch. During the first seven-eighths inch of travel the sleeve freely slides over link 74. Finally, the end of link 74 abuts the bottom of the opening 72 in sleeve 70 and the additional travel of the piston rod moves control bar 22 a distance sufficient to force the shutters open approximately one-eighth of an inch. In a typical application this amount of opening is sufficient to cool the condenser yet is not large enough to affect significant radiator heating.

If the engine radiator requires cooling, valve 32 closes, cutting the source of pressure to cylinders 24 and 30 thereby allowing the shutters to return to their normal biased open position.

In all phases of operation, actuator 24 is the primary control and will always respond to engine cooling requirements. As long as the shutters are open, actuator 30 does not operate on the louvers at all. It is only when all of the louvers are closed that actuator 30 causes a slight opening to provide for condenser cooling requirements when the clutch 50 is energized and the compressor 36 is operated.

While a preferred embodiment of this invention has been illustrated and described in detail, it will be recognized that other modifications incorporating the teachings hereof can readily be made in the light of this disclosure. Accordingly, all modifications embodying the principles of this invention are to be considered as included in the following claims unless these claims by their language expressly state otherwise.

The embodiments of the invention in which an exclusive property or privilege is claimed are defined as follows:

1. A shutter control system for controlling the air flow over radiator and condenser elements in an automotive vehicle having an air conditioning system comprising:
    a shutter assembly including a plurality of pivotally mounted louvers, said louvers being shiftable between opened and closed positions, and being normally biased to an open position;
    first actuator means for shifting said louvers to a closed position in response to engine temperature; and
    second actuator means for shifting said louvers toward an open position when said louvers are closed by said first actuator means.

2. The shutter control assembly as defined in claim 1 wherein said first and second actuator means are adapted for operation by a source of fluid pressure and further including:
    conduit means for connecting said first and said second actuator means to a common source of fluid pressure;
    first valve means in said conduit means for controlling fluid pressure therein in response to engine temperature; and second valve means associated with said second actuator means and said connecting means for controlling the application of fluid pressure to said second actuator means in response to operation of the air conditioning system.

3. The apparatus as defined in claim 2 wherein said first valve means is a thermally responsive valve adapted for connection between a source of fluid pressure and said first actuator means, said valve being adapted to close when the vehicle engine has reached a predetermined temperature thereby blocking the flow of fluid pressure therethrough.

4. The apparatus as defined in claim 2 wherein said second valve means includes a solenoid valve in said connecting means between said first valve means and said second actuator, said solenoid valve being normally closed and operable to apply the source of fluid pressure to said second actuator means in response to operation of the air conditioning compressor.

5. The apparatus as defined in claim 2 wherein said first and said second valve means comprise a thermally responsive valve and a solenoid valve respectively, said thermally responsive valve sensing engine temperature to control the application of fluid pressure to said first and said second actuator means in response to engine temperature changes and said solenoid valve being operative to control the application of fluid pressure to said second actuator in response to operation of the air conditioner compressor.

6. In an air conditioning system for a vehicle having an air conditioning compressor with electrically operated clutch means and a condenser, engine cooling means including a radiator, and air flow control means for said radiator and said condenser, said air flow means comprising:
a shutter assembly including a plurality of pivotally mounted louvers adapted for conjoint movement;
control means associated with said louvers for moving same between open and closed positions;
first pressure-responsive actuator means connected to said control means for moving said shutters to a closed position;
second pressure-responsive actuator means connected to said control means for moving said shutters toward an open position;
fluid pressure control means adapted to connect said first and said second actuator means to a source of fluid pressure, said control means being adapted to apply fluid pressure to said first and said second control means when the vehicle engine is below a predetermined temperature;
normally closed solenoid valve means operatively connected between said fluid control means and said second actuator;
means electrically connecting the electrically operated clutch means to said solenoid valve for opening said valve means when said clutch is operated to apply said fluid pressure to said second actuator means thereby urging said louvers toward an open position when said clutch is energized.

7. A shutter system for controlling cooling air flow over radiator and air conditioner condenser elements of an automotive vehicle, comprising:
a shutter assembly including a plurality of pivotally mounted louvers cooperably shiftable between closed and opened conditions;
biasing means operably associated with said shutter assembly to bias said louvers toward the opened condition for cooling air flow over the radiator and condenser elements;
first actuating means arranged and operably connected to said shutter assembly to shift said louvers to the closed condition against the bias of said biasing means, to thereby impede cooling air flow over the radiator element;
second actuating means arranged and operably connected to said shutter assembly in a manner to oppose said first actuating means and tend to shift said louvers to the opened condition;
said second actuating means and said biasing means having a combined force greater than that of said first actuating means to shift said louvers toward the open condition against the force of said first actuating means.

8. The shutter system in claim 7 including means to limit the amount of opening of said louvers under the combined force of said biasing means and said second actuating means to thereby allow condenser cooling without significant radiator cooling.

9. The shutter system in claim 8 wherein said means to limit louver opening comprises a lost motion connection between said second actuating means and said shutter assembly.

10. The shutter system in claim 9 wherein said lost motion connection allows said first actuating means to close said shutter assembly without having to overcome said second actuating means.

11. A shutter system for controlling cooling air flow over radiator and air conditioner condenser elements of an automotive vehicle, comprising:
a shutter assembly including a plurality of pivotally mounted louvers cooperably shiftable between closed and opened conditions;
direct force applicator means arranged to close said louvers;
counterforce applicator means arranged to open said louvers;
lost motion means between said direct force applicator means and said counterforce applicator means adapted to allow said direct force applicator means to close said louvers without having to overcome said counterforce applicator means, and said lost motion means being adapted to allow limited opening of said louvers by allowing said counterforce applicator means to partially shift before overcoming said direct force applicator means and reopening said louvers.

12. The system in claim 11 wherein said counterforce applicator means comprises a combination of actuator means and biasing means.

13. The system in claim 11 including engine sensor control means operably connected with said direct force applicator means for activation thereof; and second control means adapted to be associated with the vehicle air conditioner and operably associated with said counterforce applicator means for activation thereof.

* * * * *